United States Patent
Kim

(10) Patent No.: US 11,541,905 B2
(45) Date of Patent: Jan. 3, 2023

(54) AUTONOMOUS DRIVING CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Jun Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 243 days.

(21) Appl. No.: 16/746,095

(22) Filed: Jan. 17, 2020

(65) Prior Publication Data

US 2021/0024087 A1   Jan. 28, 2021

(30) Foreign Application Priority Data

Jul. 22, 2019   (KR) .................. 10-2019-0088489

(51) Int. Cl.
*B60W 60/00*   (2020.01)
*G05D 1/00*   (2006.01)
(Continued)

(52) U.S. Cl.
CPC ......... *B60W 60/0013* (2020.02); *B60R 22/48* (2013.01); *B60W 50/06* (2013.01);
(Continued)

(58) Field of Classification Search
CPC ......... B60W 60/0013; B60W 60/0015; B60W 30/18; B60W 50/06; B60W 2050/0095; B60W 2540/221; B60W 2540/30; B60W 2710/202; B60W 40/09; B60W 50/14; B60W 2040/0881; B60W 2050/0005; B60W 2050/0073; B60W 2510/202; B60W 2540/18; B60W 60/0051; B60W 60/0053; B60W 10/20; B60W 30/182; B60W 50/082; B60R 22/48; B60R 2022/4816; B60R 2022/4825; B60R 21/01516; B60R 21/01544; B62D 6/00; B62D 6/007; B62D 1/286; B62D 15/025; B62D 6/002;
(Continued)

(56) References Cited

U.S. PATENT DOCUMENTS

2003/0067149 A1\* 4/2003 Gray ................. B60R 21/01526
180/273
2013/0060414 A1\* 3/2013 Lee ...................... B62D 15/025
701/23
(Continued)

*Primary Examiner* — Elaine Gort
*Assistant Examiner* — Ellis B. Ramirez
(74) *Attorney, Agent, or Firm* — Lempia Summerfield Katz LLC

(57) ABSTRACT

An autonomous driving controller includes: a processor to collect driving data when a vehicle is traveling and calculate a steering override reference value, which is a criterion of determining an override mode, based on the collected driving data; and a storage to store the collected driving data and a set of instructions executed by the processor to calculate the steering override reference value. In particular, the processor controls autonomous driving by varying the steering override reference value based on the collected driving data or information regarding a driver of the vehicle.

12 Claims, 5 Drawing Sheets

(51) Int. Cl.
  *B60R 22/48* (2006.01)
  *B62D 6/00* (2006.01)
  *B60W 50/06* (2006.01)
  *B60W 50/00* (2006.01)

(52) U.S. Cl.
  CPC ............ *B62D 6/00* (2013.01); *G05D 1/0088* (2013.01); *B60R 2022/4816* (2013.01); *B60R 2022/4825* (2013.01); *B60W 2050/0095* (2013.01); *B60W 2540/221* (2020.02); *B60W 2540/30* (2013.01); *B60W 2710/202* (2013.01)

(58) Field of Classification Search
  CPC ...... B62D 6/08; G05D 1/0088; G05D 1/0061; G05D 2201/0213; B60K 35/00; B60K 2370/152; B60K 2370/175; B60Y 2300/14; B60Y 2300/182
  USPC ..... 701/25, 27, 41.48, 60, 65; 340/465, 466, 340/467; 342/69, 71
  See application file for complete search history.

(56) References Cited

U.S. PATENT DOCUMENTS

| | | | |
|---|---|---|---|
| 2015/0367789 A1* | 12/2015 | Drake | B60R 16/023 701/1 |
| 2017/0351256 A1* | 12/2017 | Kumakiri | G05D 1/0061 |
| 2019/0018409 A1* | 1/2019 | Nickolaou | G05D 1/0061 |
| 2019/0047621 A1* | 2/2019 | Kim | G08G 1/167 |
| 2019/0086917 A1* | 3/2019 | Okimoto | B60W 50/08 |
| 2019/0155279 A1* | 5/2019 | Tayama | G08G 1/0962 |
| 2019/0300013 A1* | 10/2019 | Shiraishi | B60W 60/0053 |
| 2019/0300014 A1* | 10/2019 | Nagase | B62D 1/046 |
| 2020/0117187 A1* | 4/2020 | Kothari | B60W 60/0015 |
| 2020/0207348 A1* | 7/2020 | Sato | B60W 60/0053 |

* cited by examiner

AUTONOMOUS DRIVING CONTROLLER, SYSTEM INCLUDING THE SAME, AND METHOD THEREOF

CROSS-REFERENCE TO RELATED APPLICATION

This application claims priority to and the benefit of Korean Patent Application No. 10-2019-0088489, filed on Jul. 22, 2019, the entire contents of which are incorporated herein by reference.

FIELD

The present disclosure relates to an autonomous driving controller, a system including the same, and a method thereof, and more particularly, relates to technologies of learning the driving tendency of a driver to improve a steering feeling.

BACKGROUND

The statements in this section merely provide background information related to the present disclosure and may not constitute prior art.

In general, an autonomous driving controller is a device for assisting a driver to drive his or her vehicle and is a system which instructs a steering actuator of the vehicle to continuously generate a steering torque, such that the vehicle drives in the center of the lane.

In other words, when a motor driven power steering (MDPS) is used as the actuator, a steering torque continuously occurs. In this case, a steering torque of the system is delivered to a steering wheel of the driver to show lane keeping performance. Thus, the driver feels a sense of difference in steering.

Herein, when the steering intention of the driver is measured as a constant value or more by a torque sensor, while a current mode changes from a lane keeping mode to an override mode, a steering torque is reduced or a required torque value is changed to zero ('0') to hand over control authority to the driver.

Meanwhile, with the development of an autonomous driving device, while the rate of driving environment determination and control responsibility has been increased, the importance of precise control rather than steering assistance has been emphasized. Thus, instead of a steering torque, a steering angle has been used as control input.

When the steering angle is used as the control input, because it is able to perform feedback control for a steering angle of a wheel, which has a direct influence on a lateral behavior of the vehicle compared with a steering torque, it is more robust to disturbance.

However, because the autonomous driving device based on the steering angle input should perform steering override depending on a specific condition, a sense of difference becomes large. We have discovered that even though learning the driving tendency of the driver is not necessary for assisting in torque for the steering torque override, when a steering angle is controlled, it is desired to consider the driving tendency of the driver to reduce the driver's unsmooth steering feeling.

SUMMARY

An aspect of the present disclosure provides an autonomous driving controller for learning the driving tendency of a driver, varying a steering override reference value based on the learned data and driver information, and applying the varied steering override reference value to autonomous driving control to increase satisfaction of the driver, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous driving controller may include: a processor that collects driving data when a vehicle is traveling, calculates a steering override reference value, which is a criterion of determining an override mode, based on the collected driving data, and controls autonomous driving by varying the steering override reference value based on the collected driving data or information regarding a driver of the vehicle; and a storage storing the collected driving date and a set of instructions executed by the processor to cause the processor to calculate the steering override reference value.

In one form, the processor may determine an autonomous driving mode or an override mode by comparing a steering angle of the vehicle and a steering torque change value with the varied steering override reference value and may control the vehicle based on the determined autonomous driving mode or override mode.

In another form, the processor may calculate a weight of the driver as the driver information, when the driver sits in the driver seat of the vehicle.

In other form, the processor may calculate the weight of the driver when received at least one of a signal indicating that the driver fastens his or her seat belt, a signal indicating a change in a length of the seat belt, or a signal indicating a change in a weight by a weight sensor of the vehicle.

In one form, the driving data may include at least one of a steering angle, an amount of change in steering angle, a steering torque, or an amount of change in torque.

In another form, the processor may identify the driver by comparing face data of the driver with previously stored driver information, when the driver rides in the vehicle.

In one form, the processor may determine whether an autonomous driving mode is being enabled and may calculate the steering override reference value when the autonomous driving mode is disabled.

In another form, the processor may determine whether a steering tendency of the driver is learned when the autonomous driving mode is enabled, and calculate a steering override reference value based on the learned steering tendency data when the learning of the steering tendency is completed. And the processor may calculate the steering override reference value based on a weight of the driver when the learning of the steering tendency is not completed.

In one form, the autonomous driving controller may further include a display that displays an autonomous driving control state based on the varied steering override reference value.

According to another aspect of the present disclosure, a vehicle system for a vehicle may include: a sensing device that senses driving data and information regarding a driver of the vehicle, and an autonomous driving controller that collects the driving data from the sensing device when the vehicle is traveling, calculates a steering override reference value, which is a criterion of determining an override mode, based on the collected driving data, and controls autonomous driving by varying the steering override reference value based on the collected driving data or the driver information.

In one form, the sensing device may include a weight sensor that measures a weight of the driver of the vehicle and a seat belt sensor that senses whether the driver fastens his or her seat belt or a length of the seat belt is changed.

In another form, the autonomous driving controller may determine whether the driver sits in the driver seat in the vehicle based on input values from the weight sensor and the seat belt sensor, and may calculate the weight of the driver as the driver information.

In other form, the sensing device may include a torque sensor that measures a steering torque of the vehicle and a capacitive sensor that measures an amount of change in steering torque of the vehicle.

In another form, the autonomous driving controller may determine an autonomous driving mode or an override mode by comparing a steering angle of the vehicle and a steering torque change value with the varied steering override reference value and may control the vehicle based on the determined autonomous driving mode or override mode.

In other form, the autonomous driving controller may determine whether an autonomous driving mode is being enabled, may calculate the steering override reference value when the autonomous driving mode is disabled, may determine whether the steering tendency of the driver is learned when the autonomous driving mode is enabled, may calculate the steering override reference value based on the learned steering tendency data when the learning of steering tendency is completed, and may calculate the steering override reference value based on a weight of the driver when the learning of steering tendency is not completed.

According to another aspect of the present disclosure, an autonomous driving control method may include: collecting driving data when a vehicle is traveling; learning a steering override reference value, which is a criterion of determining an override mode, based on the collected driving data; and controlling autonomous driving by varying the steering override reference value based on the collected driving data or information regarding a driver of the vehicle.

In one form, the steering override reference value may be calculated when an autonomous driving mode is disabled.

In another form, the controlling of the autonomous driving by varying the steering override reference value may include: determining whether the steering tendency of the driver is learned when the autonomous driving mode is enabled; calculating the steering override reference value based on the learned steering tendency data when the learning of steering tendency is completed; and calculating the steering override reference value based on a weight of the driver, when the learning of steering tendency is not completed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
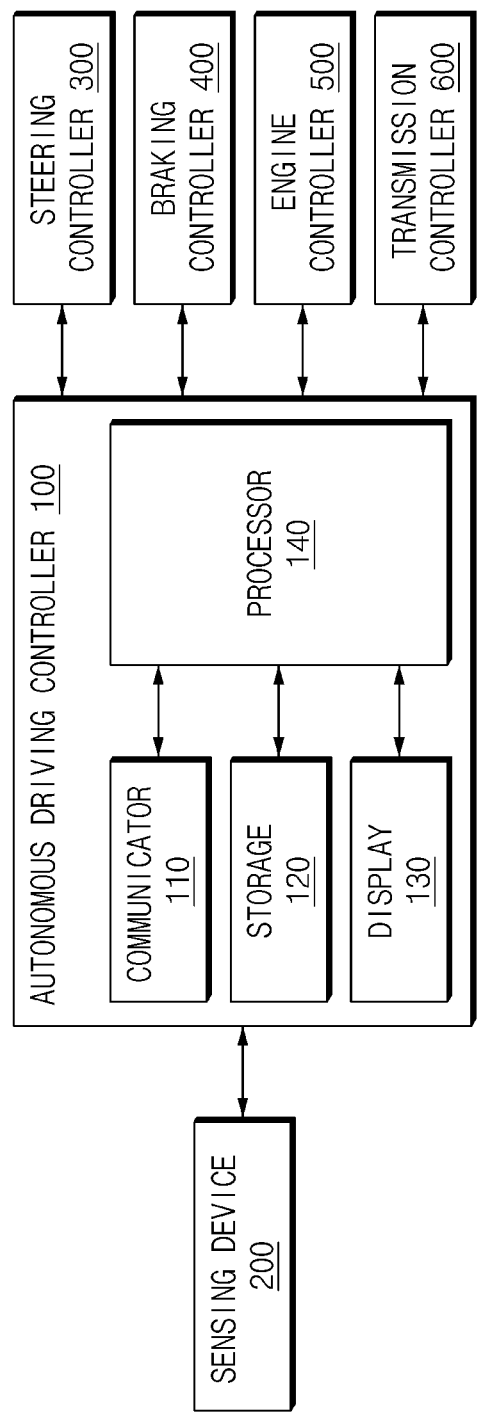
FIG. 1 is a block diagram illustrating a configuration of a vehicle system including an autonomous driving controller.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing exemplary forms of the present disclosure, a detailed description of well-known features or functions will be ruled out in order not to unnecessarily obscure the gist of the present disclosure.

In describing the components of the exemplary forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

One form of the present disclosure discloses technologies of learning the driving tendency of a driver when determining an override mode of the driver in an autonomous vehicle based on a steering angle, varying a steering override reference value, and applying the varied steering override reference value to autonomous driving control in a driver-customized manner to minimize a sense of difference in steering override.

Hereinafter, a description will be given in detail of forms of the present disclosure with reference to FIGS. 1 and 5.

Figure 2:
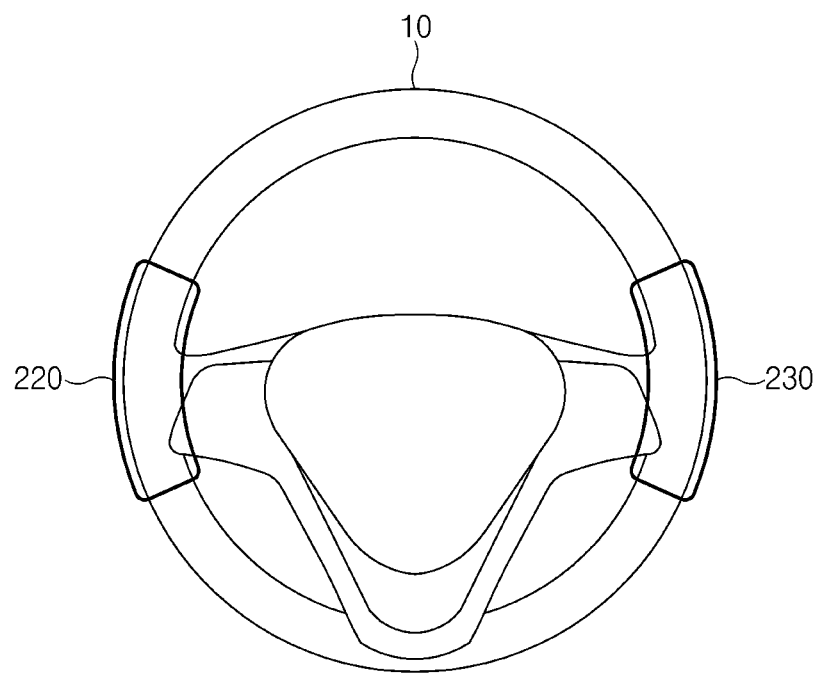
FIG. 2 is a drawing illustrating an example of mounting a sensor.

FIG. 1 is a block diagram illustrating a configuration of a vehicle system including an autonomous driving controller according to one form of the present disclosure. FIG. 2 is a drawing illustrating an example of mounting a sensor according to one form of the present disclosure.

Referring to FIG. 1, the vehicle system according to one form of the present disclosure may include an autonomous driving controller 100, a sensing device 200, a steering controller 300, a braking controller 400, an engine controller 500, and a transmission controller 600.

The autonomous driving controller 100 may collect driving data from the sensing device 200 when a vehicle is traveling, may learn a steering override reference value, which is a criterion for determining an override mode, based on the collected driving data, and may vary the steering override reference value based on the learned data or driver information to control autonomous driving. In this case, the driving data may include at least one or more of a steering angle, an amount of change in steering angle, a steering torque, or an amount of change in torque.

The autonomous driving controller 100 may include a communicator 110, a storage 120, a display 130, and a processor 140.

The communicator 110 may be a hardware device implemented with various electronic circuits to transmit and receive a signal over a wireless or wired connection. In one form of the present disclosure, the communicator 110 may perform inter-vehicle communication through controller area network (CAN) communication, local interconnect network (LIN) communication, or the like and may communicate with the sensing device 200, the steering controller 300, the braking controller 400, the engine controller 500, or the transmission controller 600.

The storage 120 may store driving data by the sensing result of the sensing device 200, and a set of instructions (e.g., a learned algorithm) executed by the processor 140 to cause the processor to calculate a steering override reference value, and the like. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SPAM), a read-only memory (ROM), a programmable ROM (PROM), an electrically erasable PROM (EEPROM), a magnetic RAM (MPAM), a magnetic disk, or an optical disk.

The display 130 may display an autonomous driving control state (e.g., an autonomous driving mode, an override mode, or the like). The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communicator 110, the storage 120, the display 130, and the like and may electrically control the respective components. The processor 140 may be an electrical circuit which executes instructions of software and way perform a variety of data processing and calculation described below.

The processor 140 may collect driving data when the vehicle is traveling, may learn a steering override reference value, which is a criterion for determining an override mode, based on the collected driving data, and may vary the steering override reference value based on the learned data or driver information to control autonomous driving.

The processor 140 may compare a steering angle of the vehicle and a steering torque change value with the varied steering override reference value to determine an autonomous driving mode or an override mode and may control the vehicle in the determined mode.

When it is determined that a driver sits in the driver's seat in the vehicle, the processor 140 may calculate a weight of the driver as driver information. The processor 140 may calculate the weight of the driver when at least one of a signal indicating that the driver fastens his or her seat belt, a signal indicating a change in a length of the seat belt, or a signal indicating a change in a weight at a weight sensor located in the vehicle is received.

When the driver rides in the vehicle, the processor 140 may compare face data of the driver with previously stored driver information to identify the driver.

The processor 140 may determine whether the autonomous driving mode is being enabled. When the autonomous driving mode is disabled, the processor 140 may learn a steering override reference value.

When the autonomous driving mode is enabled, the processor 140 may determine whether the steering tendency of the driver is learned. When the learning is completed, the processor 140 may calculate a steering override reference value based on the learned data. When the learning is not completed, the processor 140 may calculate the steering override reference value based on a weight of the driver.

As such, one form of the present disclosure may minimize that the driver feels a sense of difference for the autonomous driving controller 100 based on steering angle control by learning the override tendency of the driver, storing the learned result in the storage 120, determining an override reference value depending on the learned tendency of the driver to determine an override mode or an autonomous driving mode, and controlling the vehicle depending on the determined mode.

The sensing device 200 may include a camera for capturing a face of the driver, a torque sensor, a capacitive sensor, a weight sensor, a seat belt sensor, or the like and may transmit a sensing result value to the autonomous driving controller 100. As shown in FIG. 2, a torque sensor 220 and a capacitive sensor 230 may be mounted on a steering wheel of the vehicle. The camera may include an infrared (IR) camera used when lighting is dark. The torque sensor 220 may sense a torque value of the vehicle. The capacitive sensor 230 may measure an amount of change in steering torque of the vehicle. The weight sensor may measure a weight of the driver when the driver sits in the driver's seat. The seat belt sensor may sense whether the driver fastens his or her seat belt or a length of the seat belt.

The steering controller 300 may be configured to control a steering angle of the vehicle and may include a steering wheel, an actuator interlocked with the steering wheel, and a controller for controlling the actuator. The steering controller 300 may be implemented as a motor driven power steering (MDPS).

The braking controller 400 may be configured to control to brake the vehicle and may include a controller for controlling a brake. The braking controller 400 may be implemented as an electronic stability control (ESC).

The engine controller 500 may be configured to control to drive an engine of the vehicle and may include a controller for controlling a speed of the vehicle. The engine controller 500 may be implemented as an engine management system (EMS).

The transmission controller 600 may be configured to control to shift the vehicle. The transmission controller 600 may be implemented as a shift by wire control unit (SCU) or the like and may control a target transmission stage (P/R/N/D).

Figure 3:
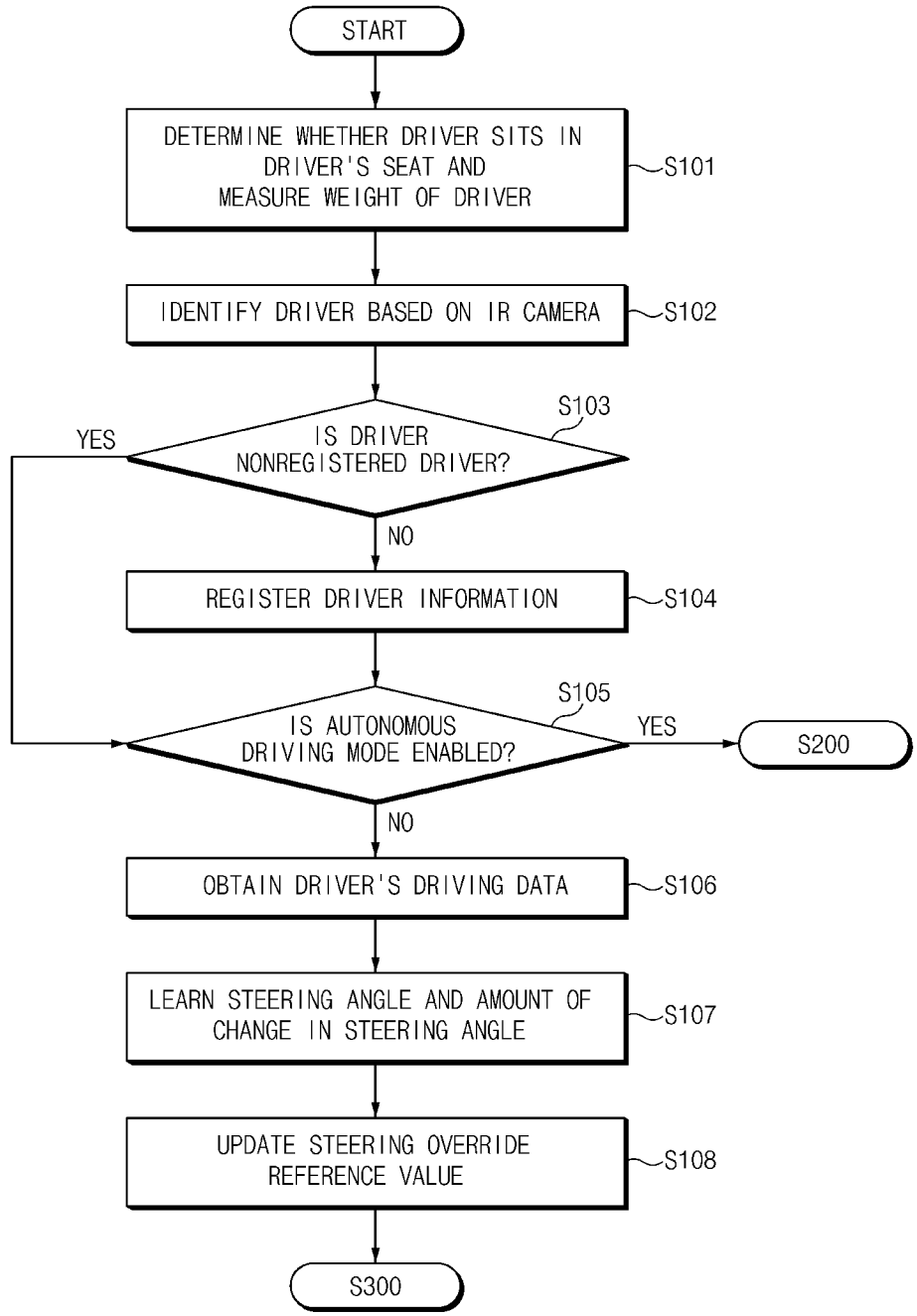
FIG. 3 is a flowchart illustrating a method for identifying a driver and processing learning information for autonomous driving control.
Figure 4:
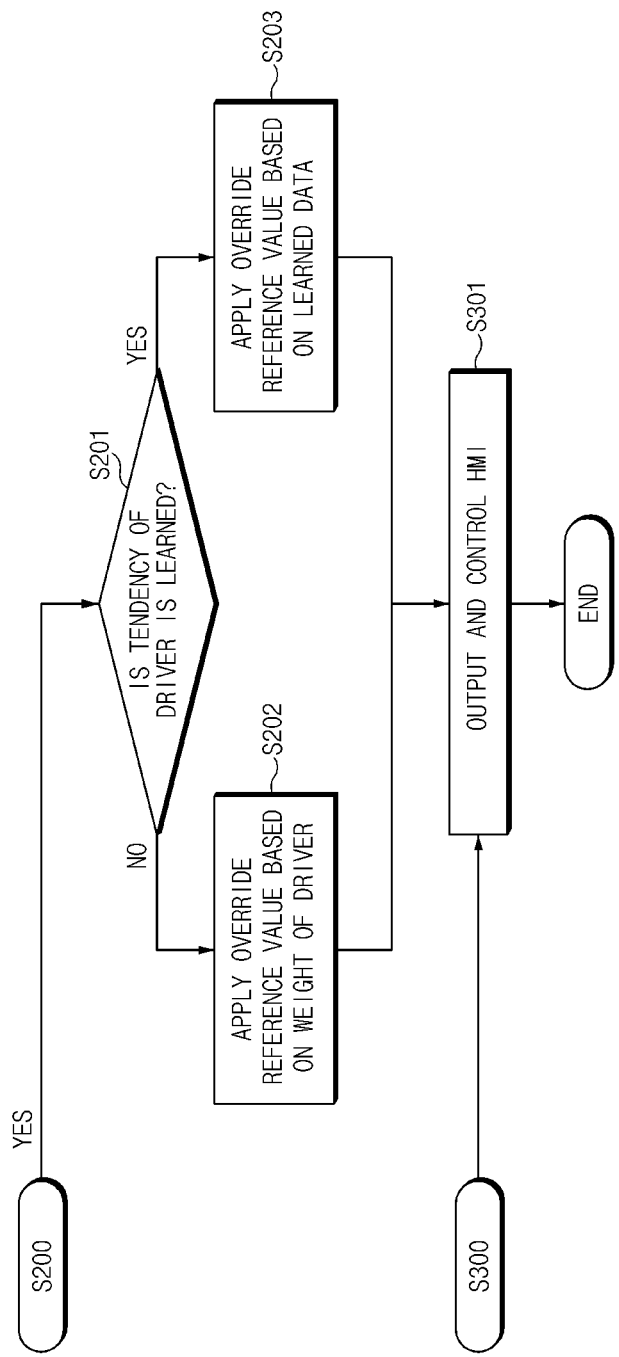
FIG. 4 is a flowchart illustrating a method for determining a reference value for autonomous driving control.

Hereinafter, a description will be given in detail of an autonomous driving control method according to one form of the present disclosure with reference to FIGS. 3 and 4. FIG. 3 is a flowchart illustrating a method for identifying a driver and processing learning information for autonomous driving control according to another form of the present disclosure. FIG. 4 is a flowchart illustrating a method for determining a reference value for autonomous driving control according to other form of the present disclosure.

It is assumed that an autonomous driving controller 100 of FIG. 1 performs processes of FIGS. 3 and 4. Furthermore, in a description of FIGS. 3 and 4, an operation described as being performed by an apparatus may be understood as being controlled by a processor 140 of the autonomous driving controller 100.

Referring to FIG. 3, in S101, the apparatus may determine whether a driver sits in the driver's seat, using a seat belt sensor or a weight sensor and may measure a weight of the driver. In other words, the apparatus may determine whether the driver sits in the driver's seat (e.g., a driver seat of the vehicle), using whether the driver fastens his or her seat belt, a length of the seat belt, or the weight sensor mounted on a bottom, backrest, or headrest portion of the driver's seat.

In S102, the apparatus may identify the driver based on an IR camera of a vehicle equipped with the autonomous driving controller 100. In this case, identifying the driver may be performed in various methods. For example, the apparatus may extract feature points from face image data captured by the IR camera and may compare the extracted feature points with previously stored feature points of the face image of the driver to identify the driver. In this case, identifying the driver using the IR camera is only one example. Embodiments of the present disclosure are not limited thereto. For example, it is able to identify the driver in various manners such as fingerprint recognition and speech recognition. In this case, the apparatus may store and manage the weight and the face recognition information depending on the identified driver.

In S103, the apparatus may determine whether the driver is a registered driver or a nonregistered driver, based on the result of identifying the driver. When the driver is the nonregistered driver, in S104, the apparatus may perform a process of registering driver information. In this case, the apparatus may register information such as a driver name and a face image to perform the process of registering the driver information.

When the driver is not the registered driver or when the process of registering the driver information is ended, in S105, the apparatus may determine whether to enable an autonomous driving mode of the vehicle.

When the autonomous driving mode of the vehicle is enabled, the apparatus may enter a process (S200) for determining a steering override reference value.

Meanwhile, when the autonomous driving mode is disabled, in S106, the apparatus may obtain driver's driving data. In S107, the apparatus may learn a steering angle and an amount of change in steering angle based on a learned algorithm. In this case, the driver's driving data may include various learning data such as maximum values and minimum values for a steering angle, an amount of change in steering angle, a steering torque, and an amount of change in torque. The apparatus may learn an amount of used torque and an amount of change in torque when the driver drives the vehicle, using a torque sensor and a capacitive sensor mounted on a steering wheel of the vehicle. In S108, the apparatus may update a steering override reference value and may store the updated steering override reference value in a storage 120. As such, the autonomous driving controller 100 according to one form of the present disclosure may learn the steering tendency of the driver, that is, a steering angle and an amount of change in steering angle, in the state where the autonomous driving mode is disabled and may update a current steering override reference value. Thereafter, in S300, the apparatus may display the updated steering override reference value on a display 130 such that a user recognizes the steering override reference value.

When the autonomous driving mode is enabled in S105, referring to FIG. 4, in S201, the apparatus may determine whether the steering tendency of the driver is learned based on a learned algorithm. When the learning of the steering tendency of the driver is not completed, in S202, the apparatus may apply the override reference value to autonomous driving control based on a weight of the driver. When the learning of the steering tendency of the driver is completed, in S203, the apparatus may apply the override reference value to autonomous driving control based on the learned steering tendency data.

In this case, the learned algorithm may be defined to calculate an override reference value based on driver information and torque usage history information of the driver.

In S301, the apparatus may determine whether to convert an override mode depending on the reference value and may display the autonomous driving mode on a human-machine interface (HMI) which is the display 130, thus performing autonomous driving control. For example, when the steering angle is greater than an override reference value, the apparatus may control an override mode (a driver mode). When the steering angle is less than or equal to the override reference value, the apparatus may control the vehicle in the autonomous driving mode.

As such, the autonomous driving controller 100 according to one form of the present disclosure may vary and control a steering override value depending on driver information (e.g., a weight, tendency, or the like) during an autonomous driving operation.

Figure 5:
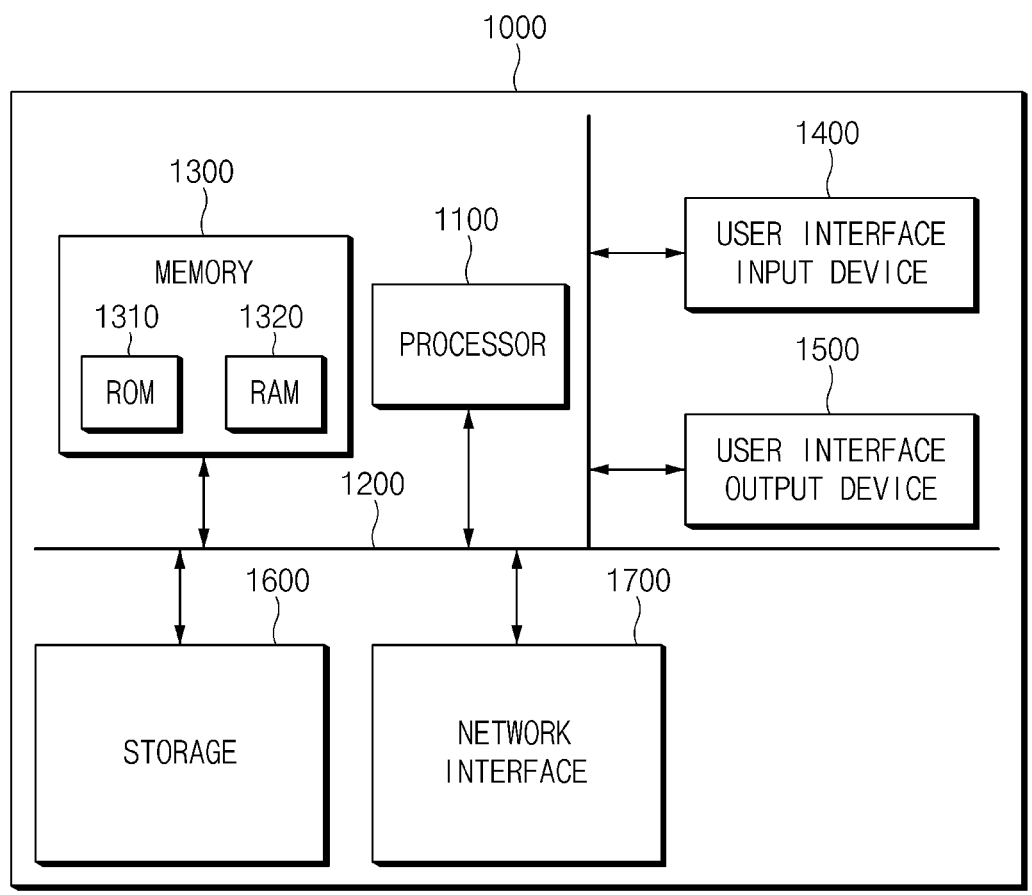
FIG. 5 is a block diagram illustrating a computing system.

FIG. 5 is a block diagram illustrating a computing system according to another form of the present disclosure.

Referring to FIG. 5, a computing system 1000 may include at least one processor 1100, a memory 1300, a user interface input device 1400, a user interface output device 1500, storage 1600, of a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may reduce a sense of difference in steering override in a driver-customized manner by learning the steering tendency of the driver based on a steering torque of the vehicle and an amount of change in steering torque, varying a steering override reference value based on the learned data and driver information, and applying the varied steering override reference value to autonomous driving control.

In addition, various effects directly or indirectly ascertained through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An autonomous driving controller, comprising:
   a processor configured to:
      collect driving data when a vehicle is traveling,
      calculate a steering override reference value, which is a criterion of determining an override mode, based on the collected driving data, and
      control autonomous driving by varying the steering override reference value based on the collected driving data or information regarding a driver of the vehicle; and
   a storage configured to store the collected driving data and a set of instructions executed by the processor to cause the processor calculate the steering override reference value,
   wherein the processor is further configured to:
      determine whether a steering tendency of the driver is learned when an autonomous driving mode is enabled,
      calculate a steering override reference value based on learned steering tendency data when the learning of the steering tendency is completed, and
      calculate the steering override reference value based on a weight of the driver when the learning of the steering tendency is not completed,
   wherein the processor is configured to:
      determine the autonomous driving mode or the override mode by comparing a steering angle of the vehicle and a steering torque change value with the varied steering override reference value,
      control the vehicle based on the determined autonomous driving mode or override mode, and
      calculate the weight of the driver as the driver information, when the driver sits in a driver seat of the vehicle.

2. The autonomous driving controller of claim 1, wherein the processor is configured to calculate the weight of the driver when received at least one of a signal indicating that the driver fastens a seat belt, a signal indicating a change in a length of the seat belt, or a signal indicating a change in a weight by a weight sensor of the vehicle.

3. The autonomous driving controller of claim 1, wherein the collected driving data includes at least one of the steering angle, an amount of change in steering angle, a steering torque, or an amount of change in torque.

4. The autonomous driving controller of claim 1, wherein the processor is configured to identify the driver by comparing face data of the driver with previously stored driver information, when the driver rides in the vehicle.

5. The autonomous driving controller of claim 1, wherein the processor is configured to determine whether the autonomous driving mode is being enabled and calculate the steering override reference value when the autonomous driving mode is disabled.

6. The autonomous driving controller of claim 1, further comprising:
   a display configured to display an autonomous driving control state based on the varied steering override reference value.

7. A vehicle system for a vehicle, comprising:
   a sensing device configured to sense driving data and information regarding a driver of the vehicle; and
   an autonomous driving controller configured to:
      collect the driving data from the sensing device when a vehicle is traveling,
      calculate a steering override reference value, which is a criterion of determining an override mode, based on the collected driving data, and
      control autonomous driving by varying the steering override reference value based on the collected driving data or the driver information,
   wherein the autonomous driving controller is further configured to:
      determine whether an autonomous driving mode is being enabled,
      calculate the steering override reference value when the autonomous driving mode is disabled,
      determine whether a steering tendency of the driver is learned when the autonomous driving mode is enabled,
      calculate the steering override reference value based on learned steering tendency data when the learning of steering tendency is completed,
      calculate the steering override reference value based on a weight of the driver when the learning of steering tendency is not completed,
      determine the autonomous driving mode or the override mode by comparing a steering angle of the vehicle and a steering torque change value with the varied steering override reference value,
      control the vehicle based on the determined autonomous driving mode or override mode, and
      calculate the weight of the driver as the driver information, when the driver sits in a driver seat of the vehicle.

8. The vehicle system of claim 7, wherein the sensing device includes:
   a weight sensor configured to measure the weight of the driver; and
   a seat belt sensor configured to sense whether the driver fastens a seat belt or a length of the seat belt is changed.

9. The vehicle system of claim 8, wherein the autonomous driving controller is configured to:
   determine whether the driver sits in the driver seat in the vehicle based on input values from the weight sensor and the seat belt sensor, and
   calculate the weight of the driver as the driver information.

10. The vehicle system of claim 8, wherein the sensing device includes:
    a torque sensor configured to measure a steering torque of the vehicle; and a capacitive sensor configured to measure an amount of change in steering torque of the vehicle.

11. An autonomous driving control method, comprising:

collecting driving data when a vehicle is traveling;

learning a steering override reference value, which is a criterion of determining an override mode, based on the collected driving data;

controlling autonomous driving by varying the steering override reference value based on the collected driving data or information regarding a driver of the vehicle, wherein controlling of the autonomous driving by varying the steering override reference value includes:

determining whether a steering tendency of the driver is learned when an autonomous driving mode is enabled;

calculating the steering override reference value based on learned steering tendency data when the learning of steering tendency is completed; and calculating the steering override reference value based on a weight of the driver when the learning of steering tendency is not completed;

determining the autonomous driving mode or the override mode by comparing a steering angle of the vehicle and a steering torque change value with the varied steering override reference value;

controlling the vehicle based on the determined autonomous driving mode or override mode; and calculating the weight of the driver as the driver information, when the driver sits in a driver seat of the vehicle.

12. The autonomous driving control method of claim 11, wherein the steering override reference value is calculated when the autonomous driving mode is disabled.

* * * * *